United States Patent
Tskukamoto et al.

(10) Patent No.: US 7,274,168 B2
(45) Date of Patent: Sep. 25, 2007

(54) BATTERY CHARGING SYSTEM DISTINGUISHING PRIMARY AND SECONDARY BATTERIES

(75) Inventors: Hisashi Tskukamoto, Santa Clarita, CA (US); PangHoo Tan, Newhall, CA (US)

(73) Assignee: Quallion LLC, Sylmar, CA (US)

( * ) Notice: Subject to any disclaimer, the term of this patent is extended or adjusted under 35 U.S.C. 154(b) by 412 days.

(21) Appl. No.: 10/503,913

(22) PCT Filed: Sep. 18, 2003

(86) PCT No.: PCT/US03/30137

§ 371 (c)(1),
(2), (4) Date: Aug. 4, 2004

(87) PCT Pub. No.: WO2004/027955

PCT Pub. Date: Apr. 1, 2004

(65) Prior Publication Data

US 2005/0017673 A1    Jan. 27, 2005

Related U.S. Application Data

(60) Provisional application No. 60/412,521, filed on Sep. 19, 2002.

(51) Int. Cl.
*H01M 10/46* (2006.01)
(52) U.S. Cl. .................................................... 320/106
(58) Field of Classification Search ................. 320/106, 320/108, 109, 110, 112, 114, 115
See application file for complete search history.

(56) References Cited

U.S. PATENT DOCUMENTS

| | | | |
|---|---|---|---|
| 3,414,793 A | 12/1968 | Jasperson | |
| 3,675,108 A | 7/1972 | Nicholl | |
| 4,031,449 A | 6/1977 | Trombly | |
| 4,379,988 A | 4/1983 | Mattatall | |
| 4,577,144 A | 3/1986 | Hodgman et al. | |
| 4,577,145 A | 3/1986 | Mullersman | |
| 4,611,161 A | 9/1986 | Barker | |
| 4,654,573 A | 3/1987 | Rough et al. | |
| 4,912,391 A | 3/1990 | Meadows | |
| 5,210,804 A | 5/1993 | Schmid | |
| 5,253,300 A | 10/1993 | Knapp | |
| 5,303,305 A | 4/1994 | Raimo et al. | |
| 5,388,040 A | 2/1995 | Hall | |
| 5,485,090 A | 1/1996 | Stephens | |
| 5,489,835 A | 2/1996 | Stephens | |
| 5,610,494 A | 3/1997 | Grosfilley | |
| 5,691,620 A | 11/1997 | Nagai et al. | |

(Continued)

FOREIGN PATENT DOCUMENTS

JP    5-184073 A2    7/1993

(Continued)

OTHER PUBLICATIONS

International Search Report from International Application No. PCT/US2003/030137.

*Primary Examiner*—Edward H. Tso (57) ABSTRACT

A remote battery charging system comprises an identifier (52) for identifying different battery types within a device (78) to a switch (46) for allowing or disallowing charging of the battery (13). The battery charging system is particularly suitable for hearing aids.

21 Claims, 9 Drawing Sheets

U.S. PATENT DOCUMENTS

| | | |
|---|---|---|
| 5,729,115 A | 3/1998 | Wakefield |
| 5,952,814 A | 9/1999 | Van Lerberghe |
| 5,959,433 A | 9/1999 | Rohde |
| 5,963,012 A | 10/1999 | Garcia et al. |
| 6,016,046 A | 1/2000 | Kaite et al. |
| 6,040,680 A | 3/2000 | Toya et al. |
| 6,057,668 A | 5/2000 | Chao |
| 6,114,834 A | 9/2000 | Parise |
| 6,118,249 A | 9/2000 | Brockmann et al. |
| 6,275,681 B1 | 8/2001 | Vega et al. |
| 6,310,465 B2 | 10/2001 | Najima |
| 6,310,960 B1 | 10/2001 | Saaski et al. |
| 6,331,761 B1 | 12/2001 | Kumar et al. |
| 6,335,612 B2 | 1/2002 | Takano et al. |
| 6,342,826 B1 | 1/2002 | Quinn et al. |
| 6,366,056 B1 | 4/2002 | Podrazhansky et al. |
| 6,377,020 B1 | 4/2002 | Yokoyama |
| 6,429,622 B1 | 8/2002 | Svensson |
| 6,437,543 B1 | 8/2002 | Olar et al. |
| 6,444,350 B1 | 9/2002 | Toya et al. |
| 6,448,621 B1 | 9/2002 | Thakur |
| 6,456,035 B1 | 9/2002 | Crisp et al. |
| 6,456,037 B1 | 9/2002 | Jaki et al. |
| 6,498,455 B2 | 12/2002 | Zink et al. |
| 6,605,922 B2 | 8/2003 | Tamai et al. |
| 2002/0031700 A1 | 3/2002 | Wruck et al. |

FOREIGN PATENT DOCUMENTS

| | | |
|---|---|---|
| JP | 7-067260 A2 | 3/1995 |
| JP | 8-096793 A2 | 4/1996 |
| JP | 10-14126 A2 | 1/1998 |
| JP | 11-069638 A2 | 3/1999 |
| JP | 2001-119863 A2 | 4/2001 |
| JP | 2001-190027 A2 | 7/2001 |

BATTERY CHARGING SYSTEM DISTINGUISHING PRIMARY AND SECONDARY BATTERIES

CROSS REFERENCE TO RELATED APPLICATIONS

This application claims the benefit of U.S. Provisional Application Ser. No. 60/412,521 filed Sep. 19, 2002, hereby incorporated by reference in its entirety.

TECHNICAL FIELD

This invention relates to a battery charging system and more particularly to a remote battery charging system capable of distinguishing a primary from a secondary battery.

BACKGROUND ART

Many medical devices worn on the body are powered by battery. In this regard, there are at least two kinds of batteries used for this purpose: "primary batteries" and "secondary batteries". Primary batteries are generally not constructed or intended to be rechargeable, while secondary batteries are rechargeable. When the capacity of the battery begins to flag, it must be replaced or recharged. But, not all batteries can be recharged without adverse effects. When the power capacity of a primary battery falls below a certain level, it must be replaced. However, a secondary battery may have its capacity restored multiple times by recharging.

Typically, hearing aids are powered by primary batteries that require frequent replacement and are very small and difficult for children or elderly people to handle and replace. Other hearing aids are powered by secondary batteries that require frequent recharging. If a patient forgets to recharge the batteries during a convenient time, such as while sleeping, he may have to go without the hearing aid while the batteries are being recharged.

DISCLOSURE OF INVENTION

The present invention allows for interchangeability of primary and secondary batteries. Rechargeable batteries offer cost savings and, with remote recharging, the convenience of not having to handle the battery, while the ability to use a primary battery is desirable when no charger is available or when the patient inadvertently forgets to recharge the rechargeable battery.

In hearing aids and other medical devices worn on the body, access to the battery, whether for removal or recharging, exposes the interior of the device to threat of damage from constant handling, corrosion from sweat and other bodily fluids, and so on. Accordingly, it is advantageous to limit such access for any reason. Of course, if a primary battery must be replaced, such access is unavoidable. However, if the device is powered by a secondary battery, it is beneficial to be able to charge the battery in situ from outside the device in order to limit the time that the interior of the device is exposed to the environment. Conveniently, a secondary battery may be recharged remotely.

However, in circumstances where batteries may be recharged remotely without accessing the interior of the device in which the battery is located, a remote charger, external to the device, may not be able to detect whether the battery is primary or secondary using conventional means. For a rechargeable battery in a closed device, a remote inductive battery charger comprises a sending charging coil that may be aligned with a receiving charging coil disposed within the device and connected to the battery. An identifier is provided within the device for detecting whether a battery in the device is a primary battery or a secondary battery, and a switch is provided on the battery charger and/or the device that will open or close (or remain open or closed) according to the type of battery detected. The identifier may simply detect the battery's resistance and compare it to a prescribed value; a primary battery has high impedance compared to that of a secondary battery, and would therefore be easily distinguishable. Alternatively, the identifier may sense temperature, and a temperature rise caused by beginning to charge a primary battery will cause the charger and/or device switch to open. In these cases, the secondary battery does not require any special features for the identifier to correctly identify the battery type, and therefore can be an off-the-shelf battery. As another alternative, the secondary battery may be provided with a physical feature that acts as a switch or triggers a switch within the device to allow charging; since such a feature would not be present on a primary battery, the device would not allow charging of a primary battery. Alternative identifying parameters or features, such as electrical, mechanical, or optical, that the identifier is capable of detecting may be provided on the secondary battery, triggering opening or closing of one or more switches (or allowing them to remain closed or open).

The charger and/or the device may comprise a charging controller for controlling charging current provided to a battery in the device based on type and status of the battery to be charged, as identified by the identifier.

LEDs or other indicators may be provided to indicate diagnostic information about the battery. Such information may include whether the battery is fully charged, charging, completely discharged, or not rechargeable.

One aspect of the present invention provides a device comprising elements including device circuitry; battery contacts for accepting a replaceable battery for powering the device circuitry; a power receiver for receiving power to charge the battery; and an identifier for identifying type of the battery and controlling a switch for allowing or disallowing charging of the battery in response to the identifier. The device includes a closed casing or enclosure that contains all of these elements. The device circuitry may comprise hearing aid circuitry. The contacts may be adapted to accept, individually, a primary battery and a secondary battery, and the device circuitry may be adapted to be powered by, individually, a primary battery and a secondary battery. The power receiver may be a remote power receiver. The power receiver may comprise a receiver chosen from the group consisting of: a secondary inductive coupling coil, an antenna, an optical receiver, a solar panel, and a pressure transducer. The identifier may comprise a detector capable of detecting a factor inherent in secondary batteries or a feature in a secondary battery provided specifically for the purpose of detection. The identifier may comprise a detector chosen from the group consisting of: a current sensor, a voltage sensor, and a temperature sensor. The identifier may comprise a detector chosen from the group consisting of: a mechanical contact, a pressure sensor, an electrical sensor, an optical sensor, and a piezoelectric sensor. The switch may be located in the device, and may be normally open or normally closed. The identifier may further comprise a chip for storing information. The identifier may be adapted to convey information to a communicator on a battery charger.

Another aspect of the present invention provides a battery charging system with a primary circuit comprising: a power transmitter; and a power source for delivering power to the power transmitter; and a communicator; and a battery-powered device characterized by a secondary circuit comprising: device circuitry; battery contacts for accepting a replaceable battery for powering the device circuitry; a power receiver for receiving power from the power transmitter; an identifier located in the secondary circuit or in the primary circuit, the identifier for identifying type of the battery; and at least one switch located in the secondary circuit or in the primary circuit or both, the switch for allowing or disallowing charging of the battery in response to the identifier. The device includes a closed casing or enclosure that contains the secondary circuit. The device circuitry may comprise hearing aid circuitry. The power transmitter may be chosen from the group consisting of: a primary inductive coil, an RF transmitter, a light transmitter, a sound transmitter, and a pressure transmitter. The power source may supply AC or DC voltage. The communicator may utilize radio frequency, infrared, or a combination thereof. The device circuitry may comprise hearing aid circuitry. The contacts may be adapted to accept, individually, a primary battery and a secondary battery and the device circuitry may be adapted to be powered by, individually, a primary battery and a secondary battery. The power receiver may be a remote power receiver. The power receiver may comprise a receiver chosen from the group consisting of: a secondary inductive coupling coil, an antenna, an optical receiver, a solar panel, and a pressure transducer. The identifier may comprise a detector capable of detecting a factor inherent in secondary batteries or a feature in a secondary battery provided specifically for the purpose of detection. The identifier may comprise a detector chosen from the group consisting of: a current sensor, a voltage sensor, and a temperature sensor. The identifier may comprise a detector chosen from the group consisting of: a mechanical contact, a pressure sensor, an electrical sensor, an optical sensor, and a piezoelectric sensor. The identifier may further comprise a chip for storing information. The identifier may be adapted to convey information to the communicator. The switch may be located in the primary or secondary circuit, and may be normally open or normally closed. The battery charging system may further comprise: an indicator for indicating the battery type or charge status or both. The battery charging system may further comprise: a charging controller for adjusting charging parameters in response to the identifier. The charging controller may be located in the primary or secondary circuit. The switch may be located in the primary circuit and the identifier may be located in the secondary circuit. Both the switch and identifier may be located in the secondary circuit. The switch may be located in the secondary circuit and the identifier may be located in the primary circuit.

Another aspect of the present invention provides a charger for charging a battery in a battery-powered device, comprising: a remote power transmitter for transmitting power to a power receiver; a power source for delivering charging current to the power transmitter; a communicator for receiving signals from a detector in the device; and a switch responsive to signals from the communicator, wherein activating the switch allows charging of the battery. The switch may be normally open or normally closed. The charger or device may further comprise a read/write chip for reading from and writing to a code storage chip information identifying the battery type. The charger may further comprise an indicator for displaying the battery type or charging status or both. The charger may further comprise a charging controller responsive to the communicator for adjusting charging parameters to the power transmitter.

Another aspect of the present invention provides a method for charging a battery comprising: providing a battery-powered device with contacts for accepting a battery, the device comprising a power receiver for charging the battery; installing a battery into the device; providing a battery charger; remotely coupling a power transmitter of the battery charger with the power receiver; identifying battery type of the battery using an identifier in the device or the charger; and delivering charging power to the battery only if the detected battery is a rechargeable battery of a type known to the identifier. The method may further comprise adjusting charging parameters based on the detected battery type. The may further comprise storing a code identifying the battery type. The method may further comprise indicating the battery type or charge status or both.

BEST MODE FOR CARRYING OUT THE INVENTION

The following text describes the preferred mode presently contemplated for carrying out the invention and is not intended to describe all possible modifications and various consistent with the spirit and purpose of the invention. The scope of the invention should be determined with reference to the claims.

Figure 1:
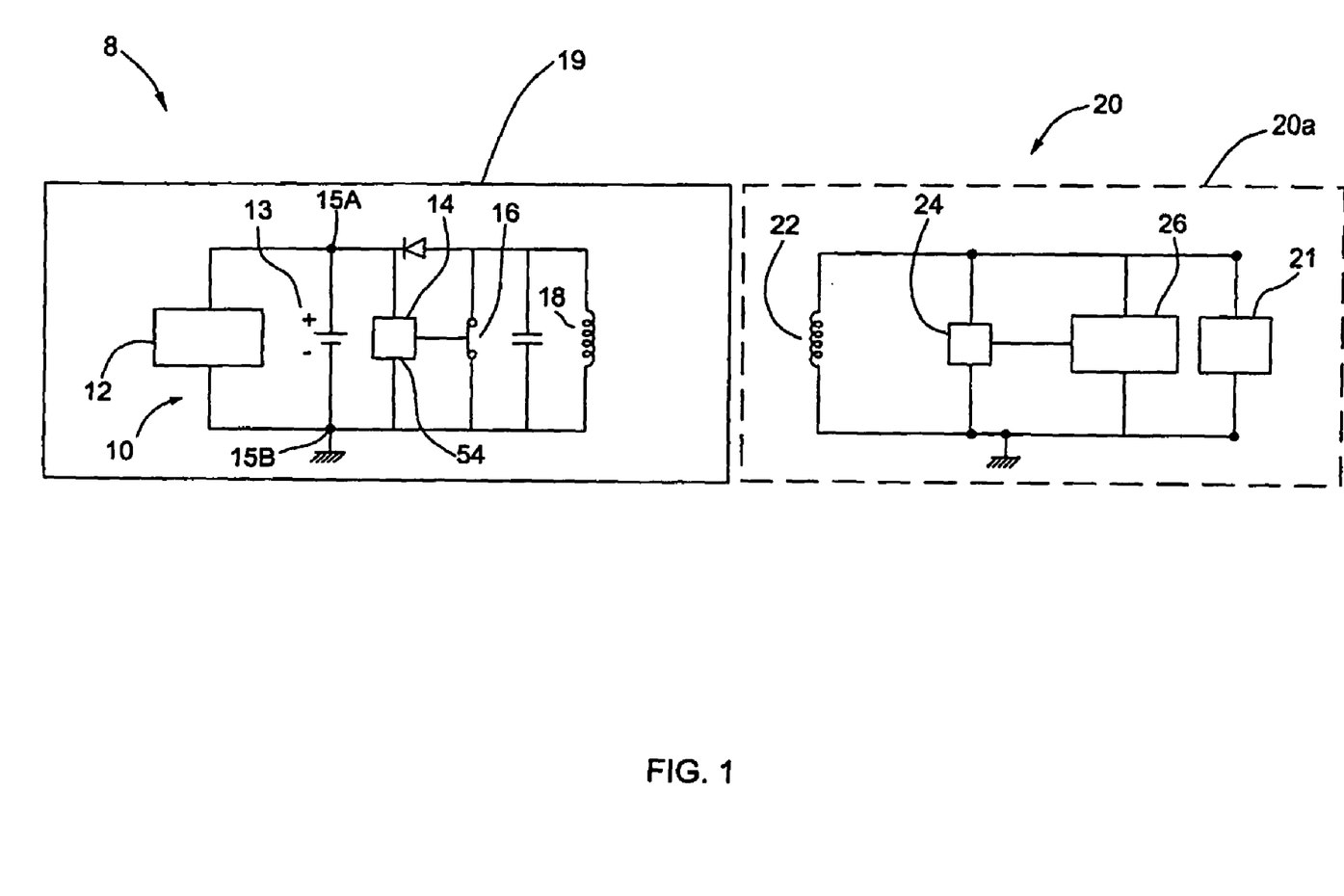
FIG. 1 is a circuit diagram a first embodiment of the battery-charging system of the present invention.

FIG. 1 is a circuit diagram of a first embodiment of the battery-charging system of the present invention. A battery powered device 8 is shown. The device 8 includes a secondary circuit 10 that comprises device circuits 12, contacts 15a and 15b for accepting battery 13, a power receiver 18, an identifier 14, and a switch 16. The power receiver 18 may be embodied, for example, in a secondary inductive coil or inductor constructed to couple magnetically with a corresponding element outside the device 8. All elements of the device 8 are contained in a closed casing or enclosure 19. The enclosure 19 is preferably one that can be sealed to prevent fluid intrusion into the device 8. The material of which the enclosure 19 is constructed is penetrable by the form of energy by which charging power is provided to the power receiver.

Battery 13 is replaceable, and may comprise a primary or secondary battery. Furthermore, the type of secondary battery is not limited, and the device 8 may be capable of utilizing more than one type of secondary battery, such as lithium ion, nickel metal hydride, or nickel cadmium.

A remote battery charger 20 operates cooperatively with the device 8 to recharge a battery in the device 8. In this regard, the power receiver 18 receives power from a power transmitter 22 of the battery charger 20 for charging battery 13. The power transmitter 22 may be embodied, for example, in a primary inductive coil or an inductor constructed to couple magnetically with the inductive power receiver 18. It should be noted that the form of energy transmission between the power transmitter and receiver is not limited to inductive, and may comprise solar, optical (See U.S. Pat. No. 6,310,960), ultrasound, pressure, radio frequency (including microwave), or any other form. Power receiver 18 is preferably of a type that can be sealed to prevent fluid intrusion into the device, and more preferably, one that can be completely sealed within the device 8 and not require direct contact to the power transmitter 22.

In the device 8, the identifier 14 comprises a detector for detecting temperature, current, voltage, and/or any other factor that will aid in determining whether to continue charging battery 13 and applicable parameters for charging. Identifier 14 further comprises a determiner for using the detected factor to determine what battery type battery 13 is. That is, the determiner operates to determine whether the battery 13 is a primary battery or a secondary battery. In particular, the determiner operates the switch 16 based upon this information. Identifier 14 further comprises a conveyor for conveying this information to corresponding communicating elements within and outside of the device 8. For example, the conveyor may be embodied as a wireless network device or an RF transmission device for conveying information to and receiving information from other such elements including such elements in the remote battery charger 20.

In the embodiment of FIG. 1, switch 16 is located on the secondary circuit 10 and is a normally-open switch or relay that can be closed to form a short circuit in response to the identifier 14, preventing current flow through power receiver 18.

The battery charger 20 includes a primary circuit 20*a* which comprises elements including a power source 21, a power transmitter 22, and a communicator 24 for receiving information from the conveyor of identifier 14 and transmitting to optional indicator 26 information regarding charging status and/or battery type. The communicator may comprise a wireless network device or an RF transmission device for conveying information to and receiving information from other such elements including such elements in the device 8. The power source 21 may comprise AC line voltage, a DC battery, or any other suitable supply of power.

Indicator 26 may be located either on primary circuit 20*a*, as shown in FIG. 1, or on the secondary circuit 10, or both. When the indicator is located on the secondary circuit, the information may be received directly from the identifier 14. The indicator may comprise an analog or digital display, and/or may have LED indicator lights to display information.

Figure 2:
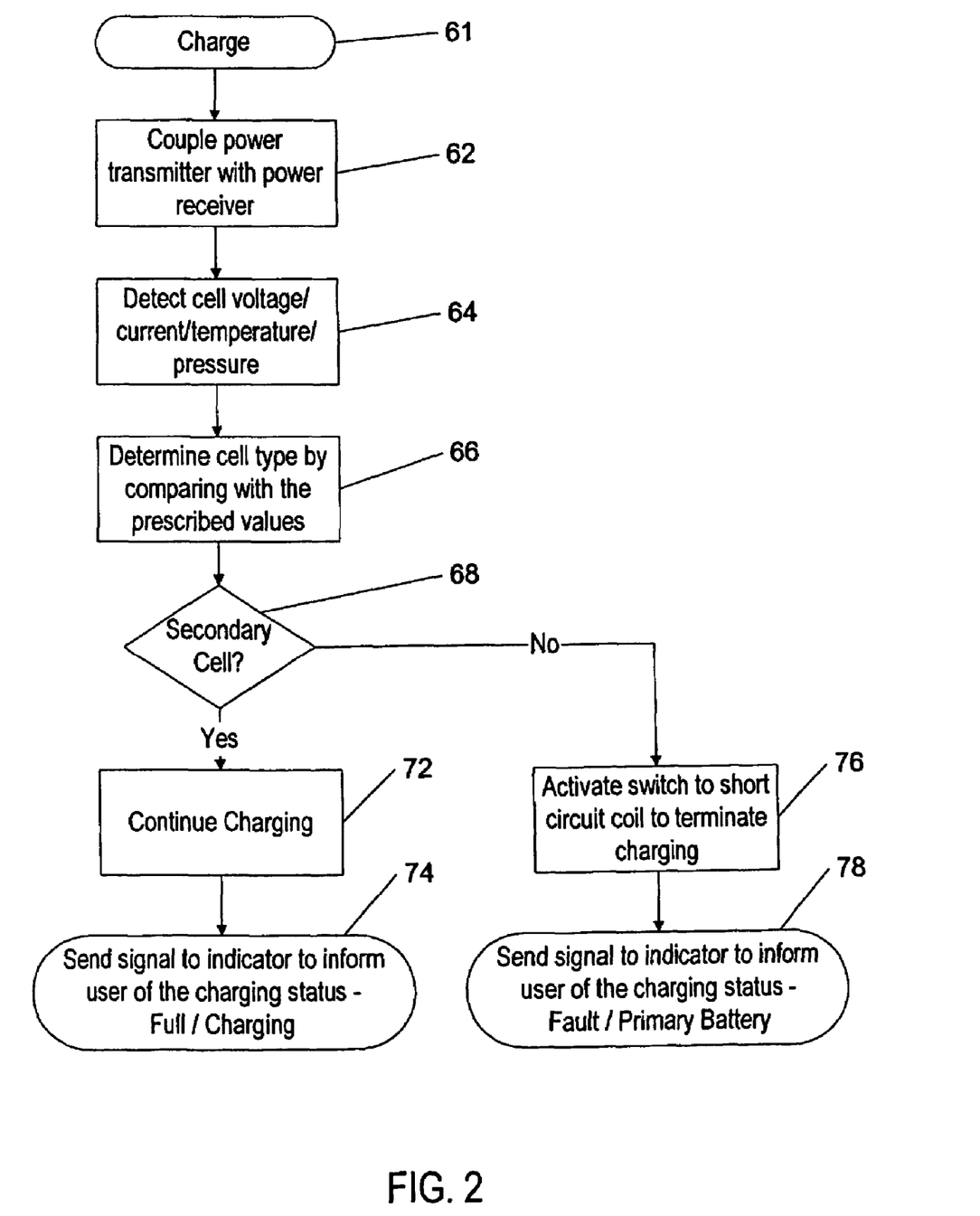
FIG. 2 is a flow chart for the battery-charging system of FIG. 1.

FIG. 2 is a flow chart showing the method of operation of the system of FIG. 1. In step 61, the patient initiates charging of the battery. At step 62, energy in the primary coil 22 is coupled to the secondary coil 18. At step 64, the identifier 14 detects cell voltage, current, temperature, and/or other factors. At step 66, the value or values detected by identifier 14 are compared with predetermined values. At step 68, the determiner determines whether the device is a secondary cell. If it is determined that the cell is a secondary cell, charging continues at step 72. At step 74, a signal is sent to the indicator 26 to inform the user of the charging status. If at step 68, the determiner determines that the device is not a secondary cell, switch 16 is closed at step 76 to prevent current flow through power receiver 18. Then at step 78, a signal is sent to indicator 26 to inform the user of the charging status. Indicator 26 may comprise a panel having lights indicating status such as "fault/primary battery", "fully charged", and "charging". In the case of certain detectors capable of detecting factors helpful in distinguishing charge status or type of primary battery, charge status or type of primary battery may also be shown.

Figure 3:
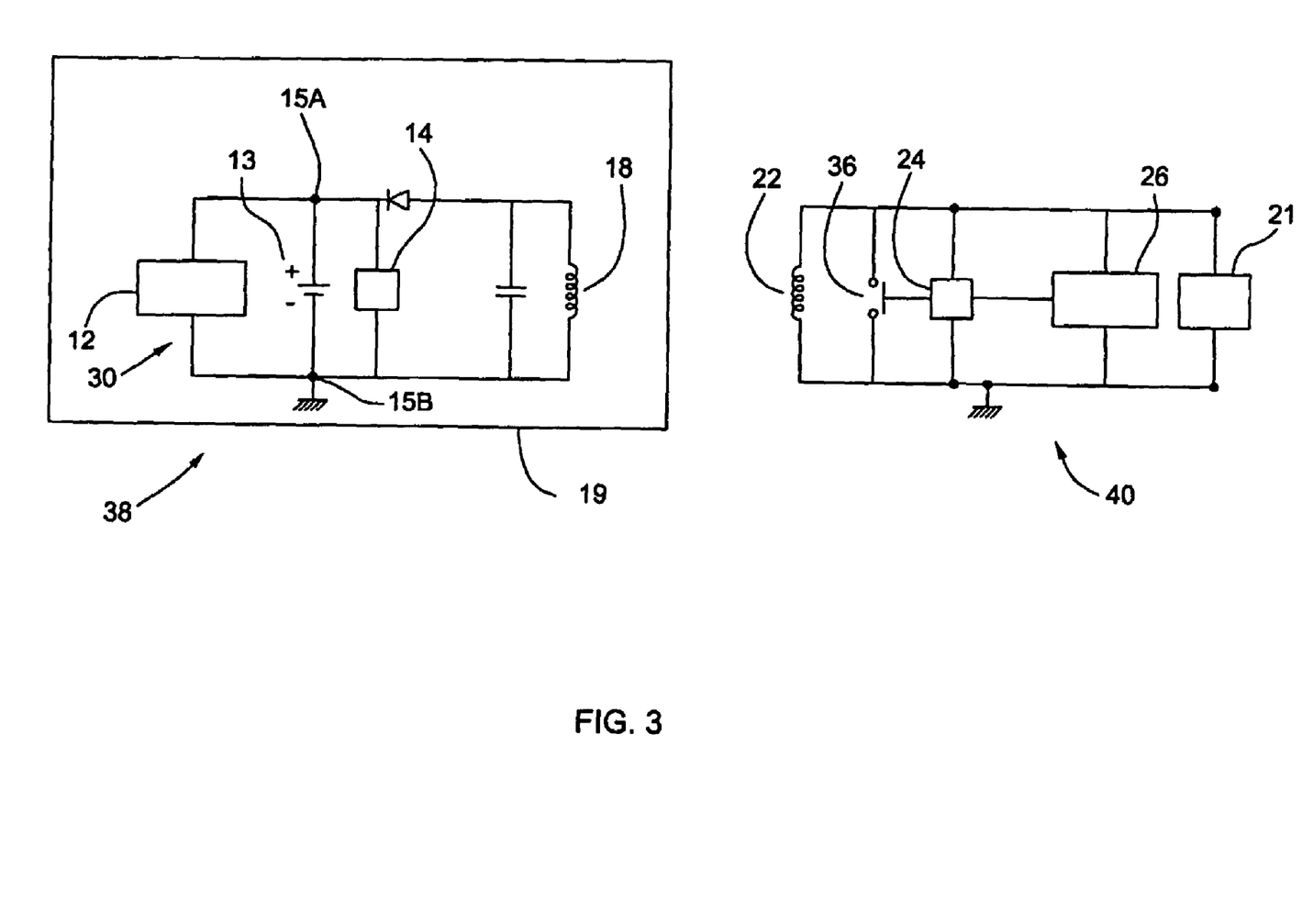
FIG. 3 is a circuit diagram of a second embodiment of the battery-charging system of the present invention.

FIG. 3 is a circuit diagram of a second embodiment of the battery-charging system of the present invention. A battery powered device 38 is shown by secondary circuit 30 that comprises elements including device circuits 12, contacts 15*a* and 15*b* for accepting replaceable battery 13, and an identifier 14. All elements of the device 38 are contained in a closed casing or enclosure 19. The enclosure 19 is preferably one that can be sealed to prevent fluid intrusion into the device 38. The material of which the enclosure 19 is constructed is penetrable by the form of energy by which charging power is provided to the power receiver. A battery charger shown by primary circuit 40 comprises a power source 21, a power transmitter 22, a communicator 24, a switch 36, and an optional indicator 26.

Power transmitter 22 transmits power to power receiver 18. In the embodiment of FIG. 3, switch 36 is located on the primary circuit 40 and is a normally-open switch or relay that can be closed to form a short circuit, preventing current flow through power transmitter 22. Communicator 24 receives information from identifier 14, and sends it to switch 36 to close it or allow it to remain open. Communicator 24 may also send information to optional indicator 26 for displaying information regarding charging status. Again, indicator 26 may be located either on primary circuit 40, as shown, or on the secondary circuit 30, or both. If it is located on secondary circuit 30, the indicator may receive the information directly from the identifier 14 instead of from communicator 24.

Figure 4:
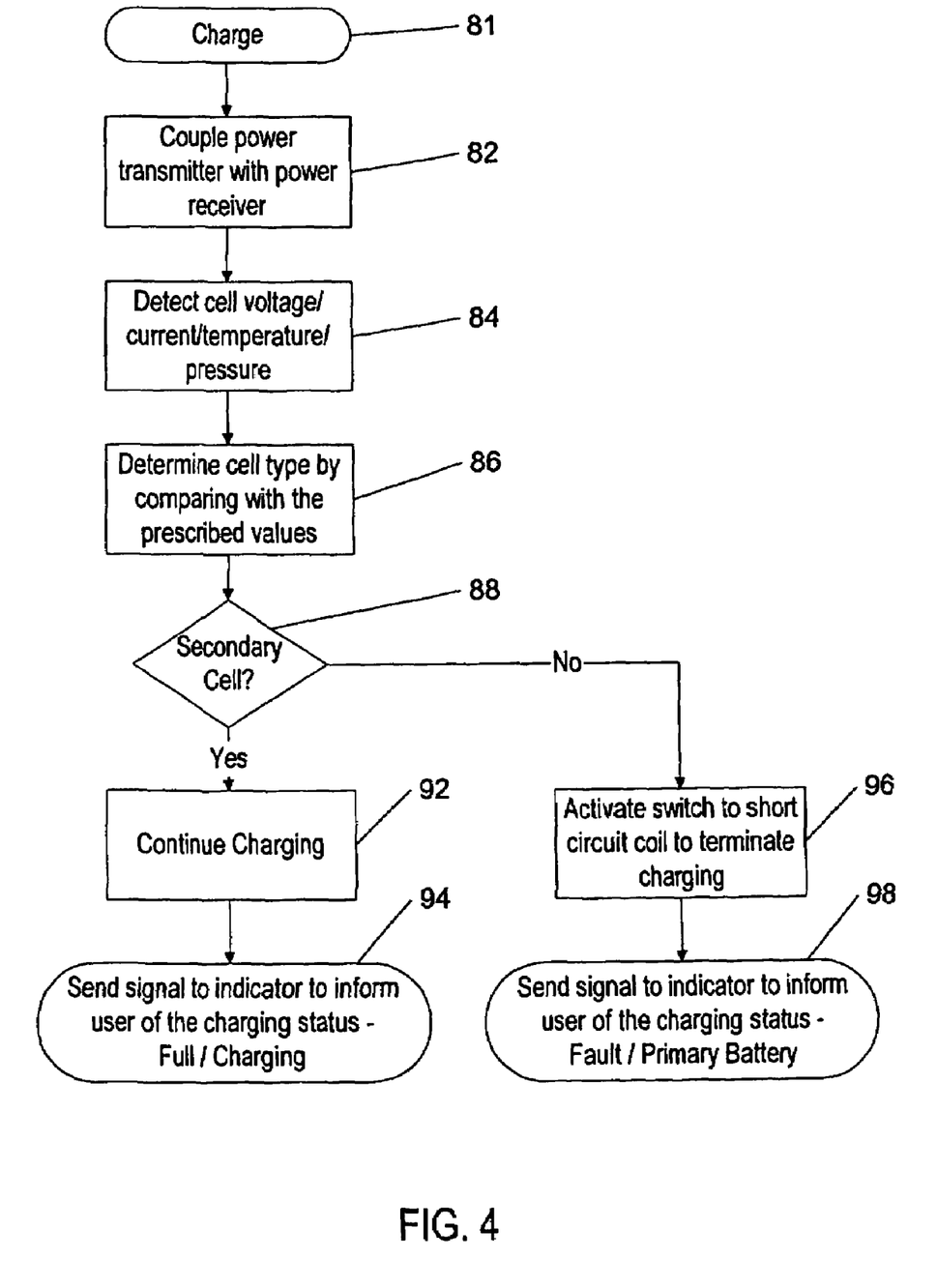
FIG. 4 is a flow chart for the battery-charging system of FIG. 3.

FIG. 4 is a flow chart showing the method of operation of the system of FIG. 3. In step 81, the patient initiates charging of the battery. At step 82 the primary coil couples with the secondary coil. At step 84, the identifier 14 detects cell voltage, current, temperature, and/or another factor. At step 86, the value or values detected by identifier 14 are compared with predetermined values. At step 88, a determiner determines whether the device is a secondary cell. If it is determined that the cell is a secondary cell, charging continues at step 92. At step 94, an RF signal is sent to the charger/indicator 26 to inform the user of the charging status. If at step 88, the determiner determines that the device is not a secondary cell, switch 36 is closed at step 96 to prevent current flow through power transmitter 22. Then at step 98, a signal is sent to indicator 26 to inform the user of the charging status.

Figure 5:
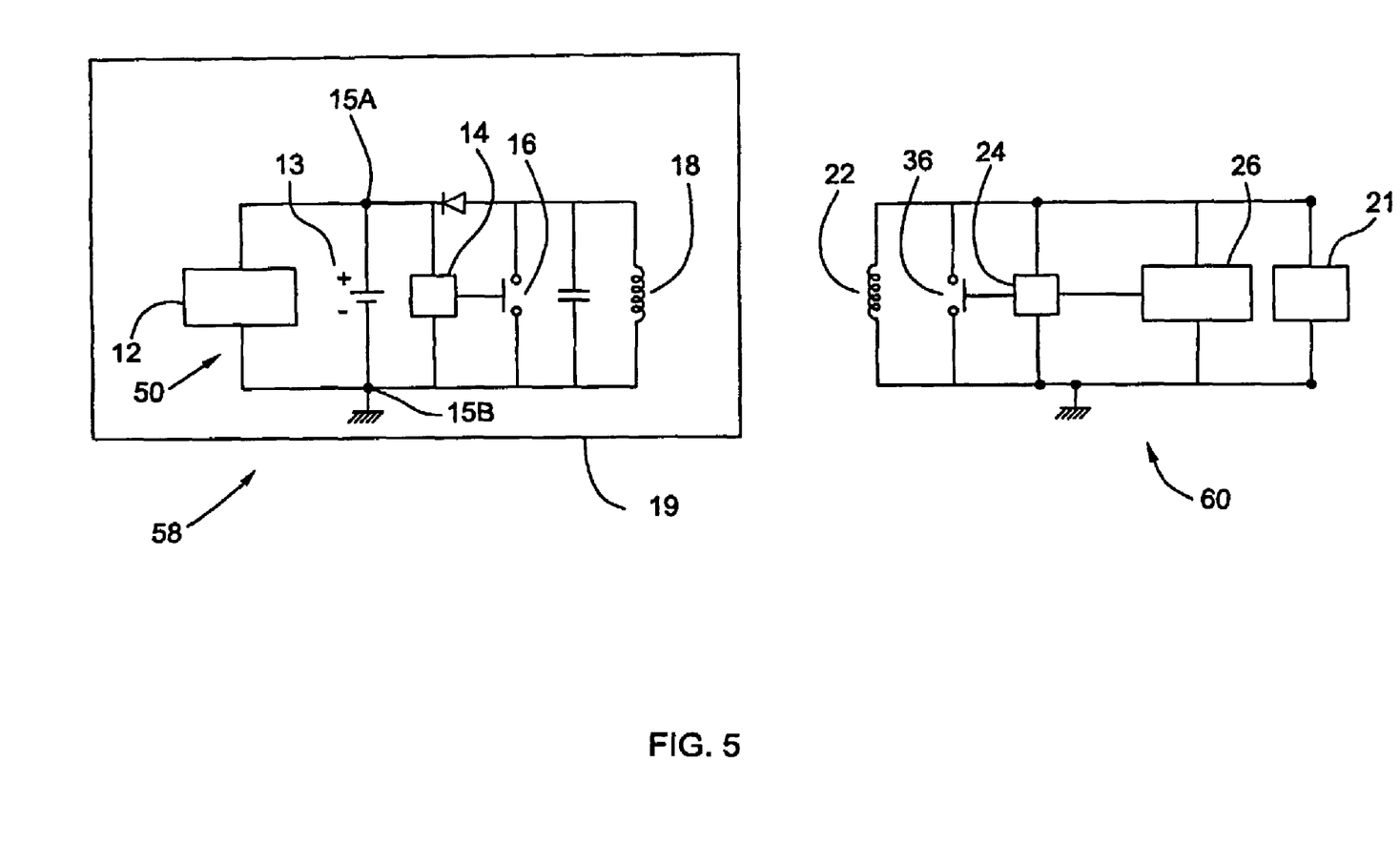
FIG. 5 is a circuit diagram of a third embodiment of the battery-charging system of the present invention.

FIG. 5 is a circuit diagram of a third embodiment of the battery-charging system of the present invention. A battery powered device 58 is shown by secondary circuit 50 that comprises elements including device circuits 12, contacts 15*a* and 15*b* for accepting a battery 13, and an identifier 14. All elements of the device 58 are contained in a closed casing or enclosure 19. The enclosure 19 is preferably one that can be sealed to prevent fluid intrusion into the device 8. The material of which the enclosure 19 is constructed is penetrable by the form of energy by which charging power is provided to the power receiver. The battery charger is shown by primary circuit 60, and comprises a power supply 21, a power transmitter 22, a communicator 24, a switch 36, and an optional indicator 26.

Power receiver 18 receives charge from a power transmitter 22. Switch 16 located on the secondary circuit 50 and switch 36 located on the primary circuit 60 are normally open switches or relays that can be closed to form a short circuit. Closing switch 16 prevents current flow through power receiver 18, whereas closing switch 36 prevents current flow through power transmitter 22. Communicator 24 receives information from identifier 14, and sends it to switch 36 to close it or allow it to remain open. Communicator 24 may also send information to optional indicator 26 for displaying information regarding charging status. Again, indicator 26 may be located either on primary circuit 60, as shown, or on the secondary circuit 50, or both. If it is located on secondary circuit 50, the indicator may receive the information directly from the identifier 14 instead of from communicator 24.

Figure 6:
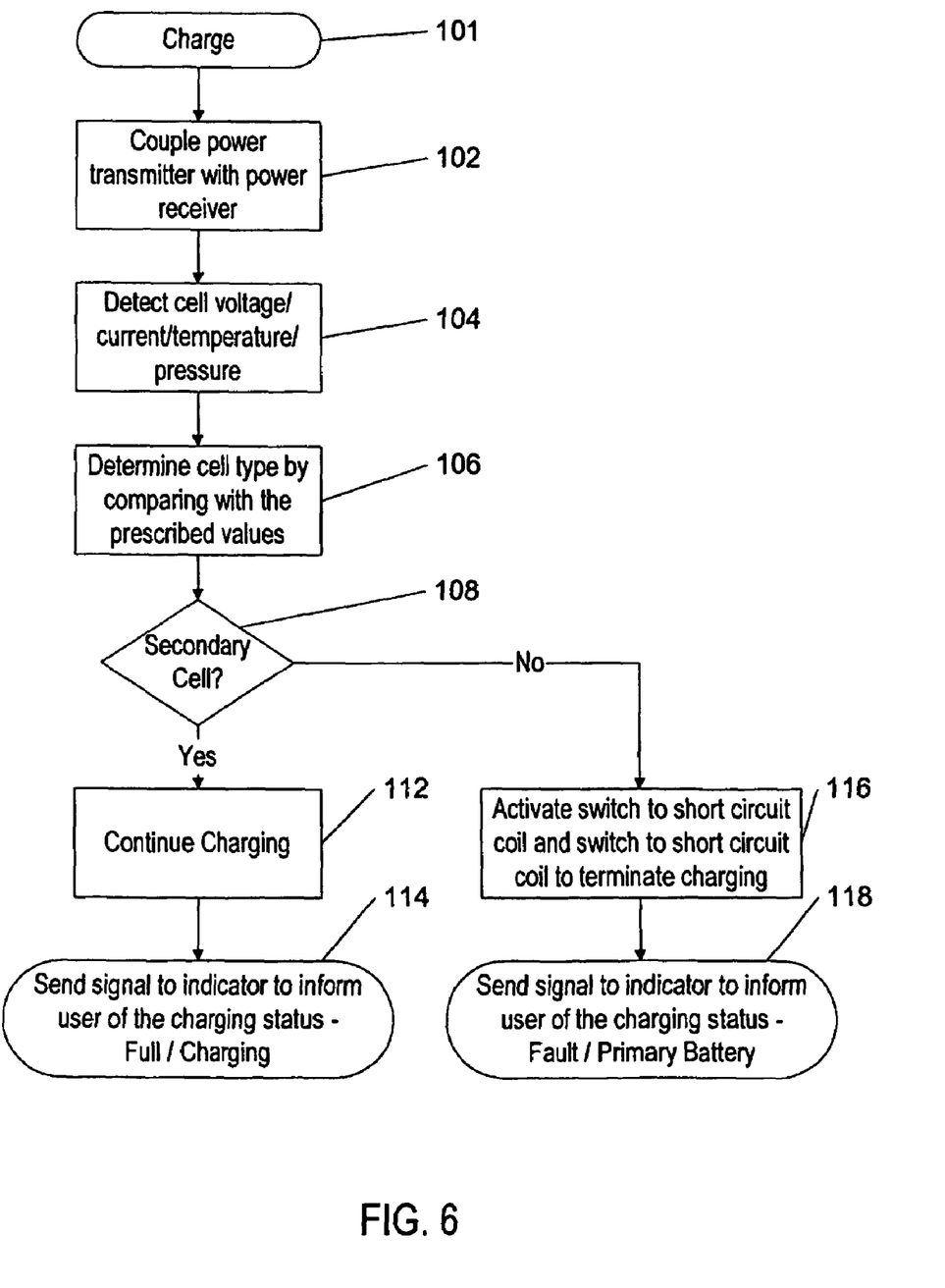
FIG. 6 is a flow chart for the battery-charging system of FIG. 5.

FIG. 6 is a flow chart showing the method of operation of the system of FIG. 5. In step 101, the patient initiates charging of the battery. At step 102 the primary coil couples with the secondary coil. At step 104, the identifier 14 detects cell voltage, current, temperature, and/or another factor. At step 106, the value or values detected by identifier 14 are compared with predetermined values. At step 108, a determiner determines whether the device is a secondary cell. If it is determined that the cell is a secondary cell, charging continues at step 112. At step 114, an RF signal is sent to the charger/indicator 26 to inform the user of the charging status. If at step 108, the determiner determines that the device is not a secondary cell, either or both of switches 16 and 36 are closed at step 116 to prevent current flow through power receiver 18 and power transmitter 22, respectively. Then at step 118, a signal is sent to indicator 26 to inform the user of the charging status.

Figure 7:
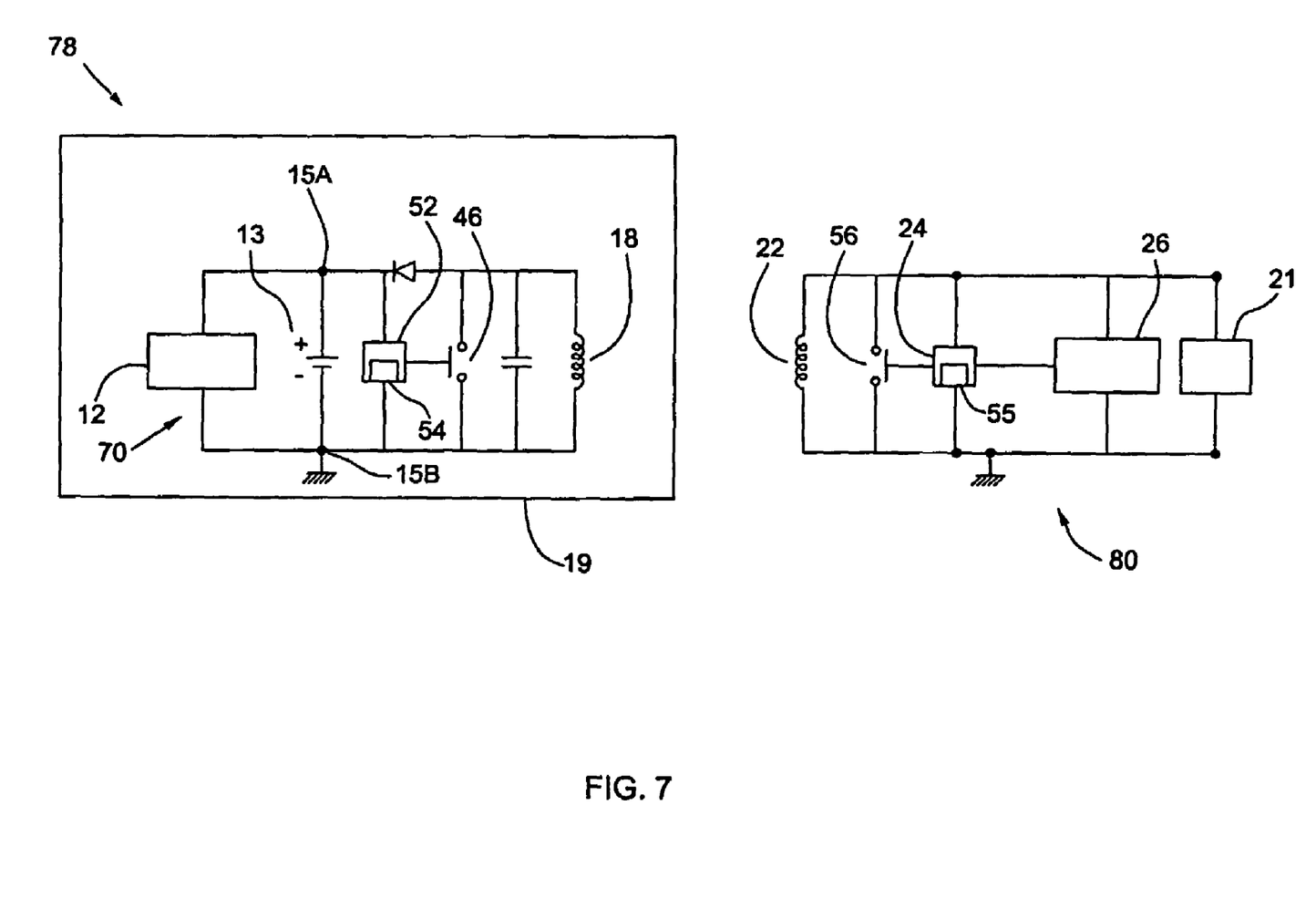
FIG. 7 is a circuit diagram of a fourth embodiment of the battery-charging system of the present invention.

FIG. 7 is a circuit diagram of a fourth embodiment of the battery-charging system of the present invention. A battery powered device 78 is shown by secondary circuit 70 that comprises elements including device circuits 12, contacts 15a and 15b for accepting a battery 13, and an identifier 52. Identifier 52 has a smart code storage chip 54, which may comprise an EPROM, to store information such as battery type and feed back to the charger before the charging is established. A read/write chip 55 for reading information from and writing information to code storage chip 54 may be located in the charger 80 as shown; alternatively, it may be located within device 78. All elements of the device 78 are contained in a closed casing or enclosure 19. The enclosure 19 is preferably one that can be sealed to prevent fluid intrusion into the device 78. The material of which the enclosure 19 is constructed is penetrable by the form of energy by which charging power is provided to the power receiver. Once the battery 13 is removed from the device 78, the chip's memory will be reset or erased. The detector can detect factors helpful in determining not only whether the battery is primary or secondary, but also factors to differentiate the type of secondary cells, such as lithium ion, nickel metal hydride, or nickel cadmium, so that charging current can be adjusted accordingly. Power receiver 18 receives power from a power transmitter 22 of a battery charger 80.

The battery-charging system of this embodiment comprises at least one normally-closed switch or relay, which may be switch 46 located on the secondary circuit 70 and/or switch 56 located on the primary circuit 80. Opening switch 46 allows current flow to battery 13; opening switch 56 allows current flow to power transmitter 22. Therefore, if both switches are present, both must open to allow the battery to charge. Note that the arrangement of the switches is not limited to that specifically disclosed. For example, normally-closed switch 46 in parallel with power receiver 18 may be replaced with a normally-open switch in series with power receiver 18; in that case, a separate backup battery may be provided to the identifier 52 to keep it active even if battery 13 is fully discharged.

The battery charger is shown by primary circuit 80 that comprises a communicator 24, for receiving the code from the smart code storage chip 54 of identifier 52, and for transmitting to indicator 26 information regarding charging status. Indicator 26 may be located either on primary circuit 80, as shown, or on the secondary circuit 70 as described above.

Figure 8:
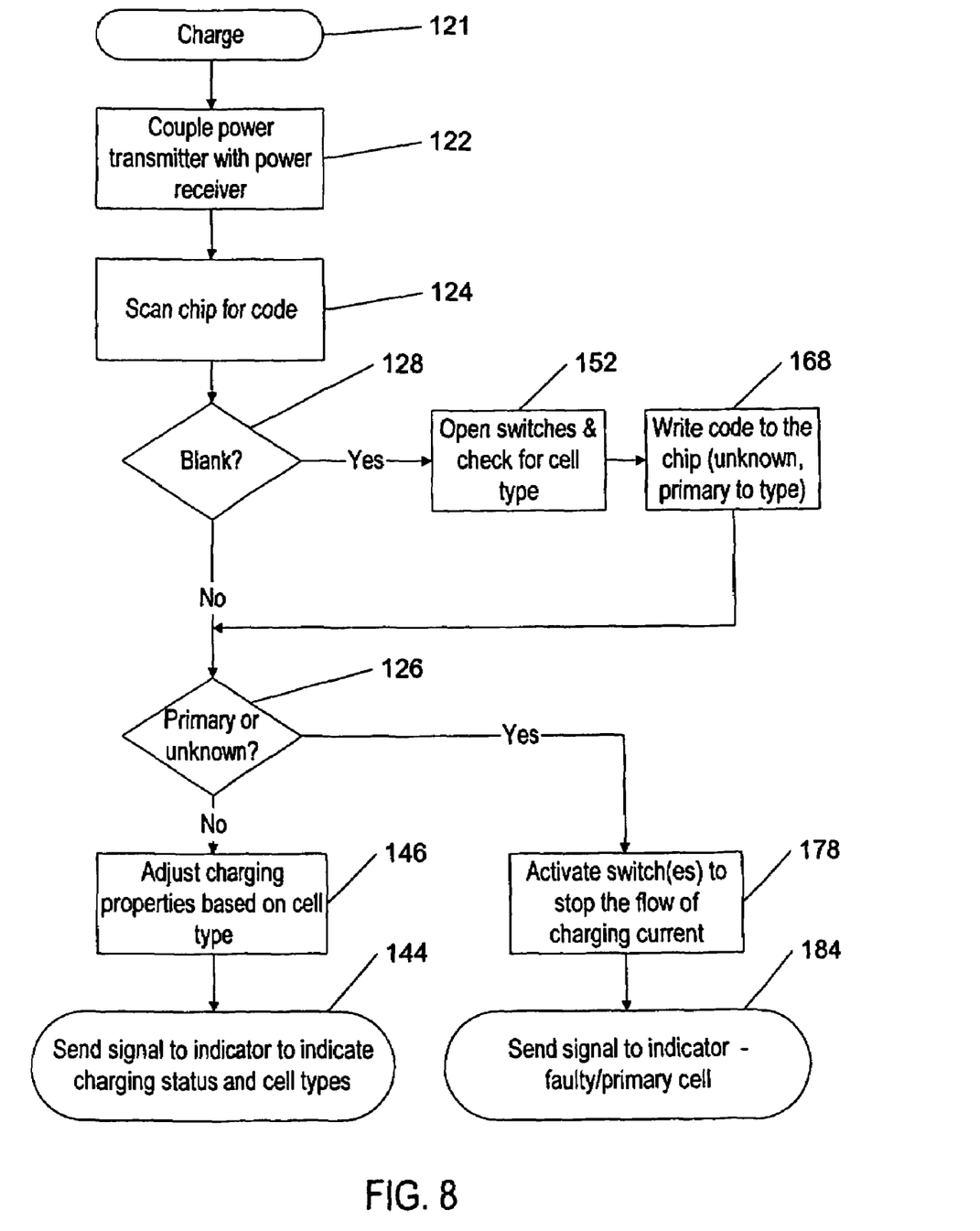
FIG. 8 is a flow chart for the battery-charging system of FIG. 7.

FIG. 8 is a flow chart showing the method of operation of the system of FIG. 7. The method begins at step 121, in which the patient initiates charging of the battery. At step 122 the primary coil couples with the secondary coil. At step 124, the RF communicator scans the code storage chip 54 for a code. If at step 128, the chip has no code or still has its initial setting (is "blank"), switches 46 and 56 are opened at step 152 and the cell type is checked. Then at step 168, a code is written to code storage chip 54 to indicate battery type, whether primary or a particular type of secondary battery, or indicating that the battery is an unknown type. At step 126, if the code indicates that the battery is a primary battery or an unknown type, switches 46 and 56 are closed at step 178 to stop charging and at step 184, a signal is sent to indicator 26, to indicate that the cell is primary or unknown. In step 146, if the cell is a known type of rechargeable cell, a charging controller adjusts the charging parameters according to the type of cell identified, and the battery is allowed to continue charging. At step 144, a signal is sent to indicator 26 to indicate cell type and status.

Figure 9:
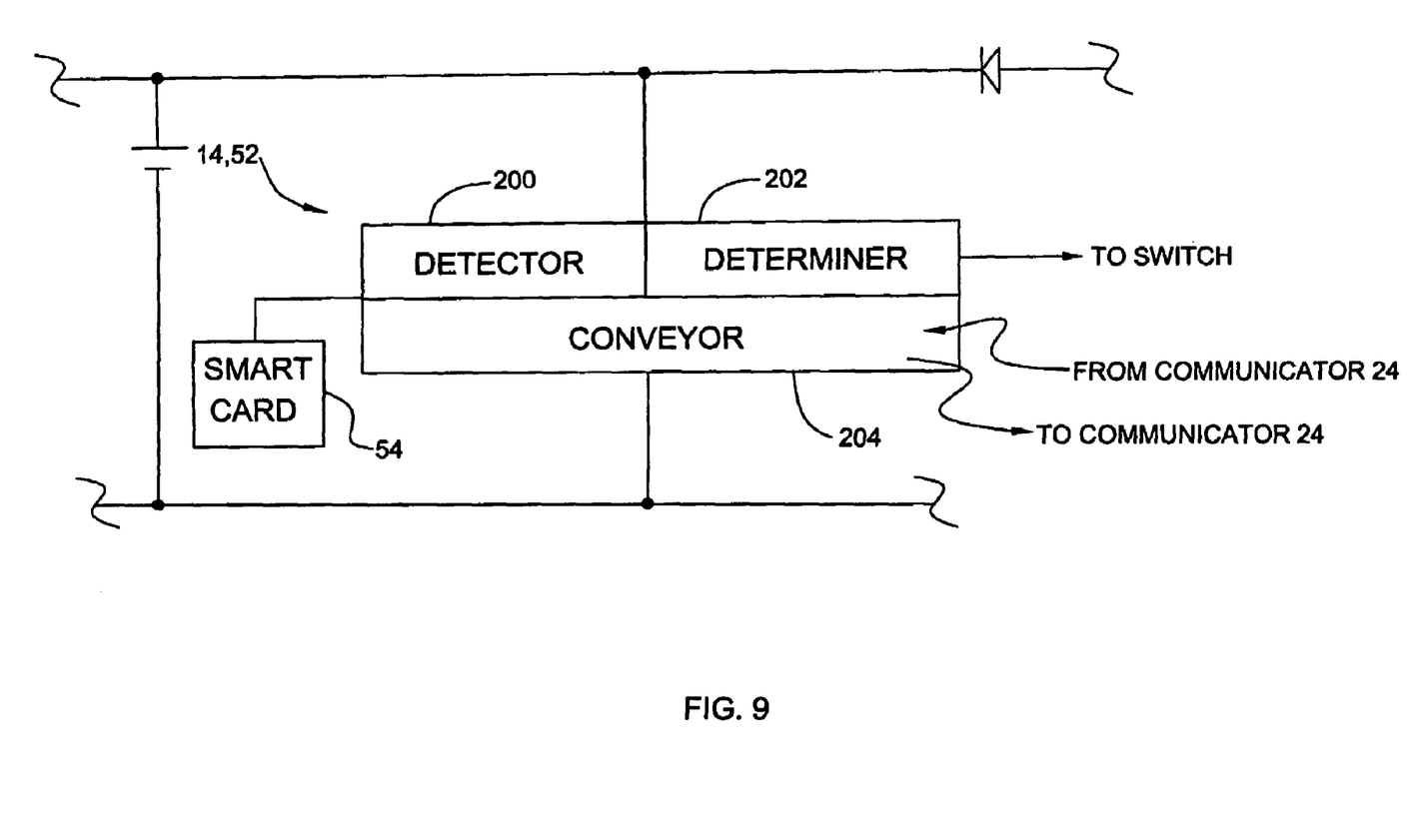
FIG. 9 is a block diagram of an identifier in a battery-operated device.

FIG. 9 is a block diagram illustrating an identifier that may be used in the devices 8, 38, 58, and 78 shown in FIGS. 1, 3, 5, and 7, respectively. In the identifier 14, 52 a detector 200 has access to the contacts 15A and 15B in order to sense the values of one or more battery operational parameters or factors including, without limitation, current, voltage, internal resistance, internal impedance, and so on. Based on one or more of those values, a determiner 202 distinguishes the type of battery disposed between the terminals 15A and 15B. If the battery is determined to be a primary battery, the determiner 202 may provide a signal to condition a switch to a state which interrupts or stops a recharging operation. If the battery is determined to be a secondary battery, the determiner 202 may provide a signal to condition or maintain a switch in a state which maintains or commences a recharging operation. A conveyor 204 is coupled to the detector 200 and the determiner 202 to convey information or data from either or both of these elements to other elements within or external to a device 8/38/58/78. For example, the conveyor, as a wireless network device or an RF transmission device may convey information concerning the type of battery detected in a device 8/38/58/78 to a location outside the device such as the communicator 24. It is contemplated that the conveyor 204 may also receive information from the communicator 24. The conveyor 204 may also be coupled to the smart code storage chip 54 in the embodiment illustrated in FIG. 7. It should be appreciated that one or more of the detector 200, the determiner 202, and the conveyor 204 may be provided as elements of the communicator 24 of any one of the battery charger embodiments shown in FIGS. 1, 3, 5, and 7.

While the invention herein disclosed has been described by means of specific embodiments and applications thereof, numerous modifications and variations could be made thereto by those skilled in the art without departing from the scope of the invention set forth in the claims. Features of one embodiment may be combined with other embodiments disclosed herein. Furthermore, various aspects of the invention may be used in other applications than those for which they were specifically described herein.

What is claimed is:

1. A device, comprising:
   device circuitry positioned in an enclosure;
   contacts configured to receive a battery the contacts being in electrical communication with the device circuitry such that a battery received by the contacts can power the device circuitry;
   a receiver positioned in an enclosure,
      the receiver being configured to output electrical energy in response to receiving energy from a transmitter located outside of the enclosure, and
      the receiver being in electrical communication with the contacts such that electrical energy output by the receiver can be received at the contacts;
   an identifier configured to determine whether a battery received by the contacts is a primary battery or a secondary battery,
      the identifier being configured to respond to the identifier determining that the battery is a secondary battery by allowing electrical energy output by the receiver to be received at the contacts at level that recharges the secondary battery, and
      the identifier being configured to respond to the identifier determining that the battery is a primary battery by reducing the electrical energy received at the contacts from the level that recharges the secondary battery.

2. The device of claim 1, wherein the identifier is configured to employ the internal resistance of a battery received by the contacts in determining whether a battery received by the contacts is a primary battery or a secondary battery.

3. The device of claim 1, wherein determining whether a battery received by the contacts is a primary battery or a secondary battery includes comparing the internal resistance of the battery to a value.

4. The device of claim 1, wherein the identifier is located in the enclosure.

5. The device of claim 1, wherein reducing die electrical energy received at the contacts includes preventing electrical energy from the receiver from being received at the contacts.

6. The device of claim 1, wherein the identifier is configured to employ the temperature of a battery received by the contacts in determining whether a battery received by the contacts is a primary battery or a secondary battery.

7. The device of claim 1, wherein reducing the electrical energy received at the contacts from the level that recharges the secondary battery includes reducing the energy transmitted from the transmitter.

8. The device of claim 1, wherein reducing the electrical energy received at the contacts from the level that recharges the secondary battery includes reducing the electrical energy output by the receiver.

9. The device of claim 1, wherein reducing the electrical energy received at the contacts from the level that recharges the secondary battery includes creating a short circuit.

10. The device of claim 9, wherein reducing the electrical energy received at the contacts from the level that recharges the secondary battery includes short-circuiting the receiver.

11. The device of claim 10, wherein the receiver is an inductor.

12. the device of claim 1, wherein reducing the electrical energy received at the contacts from the level that recharges the secondary battery includes short-circuiting the transmitter.

13. The device of clam 12, wherein the transmitter is an inductor.

14. The device of claim 1, wherein the identifier operates a switch that when in a first position allows electrical energy output by the receiver to be received at the contacts at the level that recharges the secondary battery, and when in a second position reduces electrical energy received at the contacts from the level that recharges the secondary battery.

15. The device of claim 14, wherein the switch is open when the switch is in the first position and the switch is closed when the switch is in the second position.

16. The device of claim 14, wherein the switch is closed when the switch is in the first position and the switch is open when the switch is in the second position.

17. The device of claim 1, wherein the identifier operates a switch that when in a first position allows the energy to be output by the transmitter at a first level and when in a second position reduces the energy output by the transmitter to a level below the first level.

18. The device of claim 17, the switch causes the transmitter to be short-circuited when switch is in the second position.

19. The device of claim 1, wherein the switch is located in the enclosure.

20. The device of claim 1, wherein the switch and the transmitter are located outside of the enclosure in a battery charger that is separate from the device.

21. The device of claim 1, wherein the receiver wirelessly receives the energy from the transmitter.

* * * * *